(12) United States Patent
Lakshmanamurthy et al.

(10) Patent No.: US 9,075,929 B2
(45) Date of Patent: *Jul. 7, 2015

(54) ISSUING REQUESTS TO A FABRIC

(71) Applicant: Intel Corporation, Santa Clara, CA (US)

(72) Inventors: Sridhar Lakshmanamurthy, Sunnyvale, CA (US); Mikal C. Hunsaker, El Dorado Hills, CA (US); Michael T. Klinglesmith, Portland, OR (US); Blaise Fanning, Folsom, CA (US); Eran Tamari, Ramat Gan (IL); Joseph Murray, Scottsdale, AZ (US); Kar Leong Wong, Bayan Lepas (MY); Robert P. Adler, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/578,720

(22) Filed: Dec. 22, 2014

(65) Prior Publication Data

US 2015/0113189 A1 Apr. 23, 2015

Related U.S. Application Data

(60) Continuation of application No. 14/295,810, filed on Jun. 4, 2004, which is a division of application No. 13/248,276, filed on Sep. 29, 2011, now Pat. No. 8,775,700.

(51) Int. Cl.
*G06F 3/00* (2006.01)
*G06F 5/00* (2006.01)
*G06F 13/42* (2006.01)
*G06F 13/368* (2006.01)

(52) U.S. Cl.
CPC .......... *G06F 13/4221* (2013.01); *G06F 13/368* (2013.01)

(58) Field of Classification Search
None
See application file for complete search history.

(56) References Cited

U.S. PATENT DOCUMENTS

| | | | |
|---|---|---|---|
| 5,493,566 | A | 2/1996 | Ljungerg et al. |
| 6,009,488 | A | 12/1999 | Kavipurapu |
| 6,233,632 | B1 | 5/2001 | Meiyappan et al. |
| 6,330,647 | B1 | 12/2001 | Jeddeloh et al. |
| 6,427,169 | B1 | 7/2002 | Elzur |

(Continued)

FOREIGN PATENT DOCUMENTS

WO 2005071553 8/2005

OTHER PUBLICATIONS

U.S. Patent and Trademark Office, Office Action mailed Dec. 3, 2013, with Reply filed Feb. 26, 2014, in U.S. Appl. No. 13/248,234.

(Continued)

*Primary Examiner* — Elias Mamo
(74) *Attorney, Agent, or Firm* — Trop, Pruner & Hu, P.C.

(57) ABSTRACT

In one embodiment, a method includes determining whether producer-consumer ordering rules have been met for a first transaction to be sent from a source agent to a target agent via a fabric, and if so a first request for the first transaction is sent from the source agent to the fabric in a first clock cycle. Then a second request can be sent from the source agent to the fabric for a second transaction in a pipelined manner. Other embodiments are described and claimed.

23 Claims, 10 Drawing Sheets

(56) References Cited

U.S. PATENT DOCUMENTS

| | | |
|---|---|---|
| 6,430,182 B1 | 8/2002 | Oyama |
| 6,469,982 B1 | 10/2002 | Henrion et al. |
| 6,611,893 B1 | 8/2003 | Lee et al. |
| 6,694,380 B1 | 2/2004 | Wolrich et al. |
| 6,725,313 B1 | 4/2004 | Wingard et al. |
| 6,810,460 B1 | 10/2004 | Kirkwood |
| 6,816,938 B2 | 11/2004 | Edara et al. |
| 7,065,733 B2 | 6/2006 | Goodnow et al. |
| 7,415,533 B1 | 8/2008 | Lacroute et al. |
| 7,421,543 B2 | 9/2008 | Suzuki |
| 7,457,905 B2 | 11/2008 | Gehman |
| 7,506,089 B2 | 3/2009 | Cho et al. |
| 7,573,295 B1 | 8/2009 | Stadler |
| 7,673,087 B1 | 3/2010 | Ansari et al. |
| 7,723,902 B2 | 5/2010 | Florian et al. |
| 7,783,819 B2 | 8/2010 | Mandhani |
| 7,793,345 B2 | 9/2010 | Weber et al. |
| 7,873,068 B2 | 1/2011 | Klinglesmith et al. |
| 7,979,592 B1 | 7/2011 | Pettey et al. |
| 8,010,731 B2 | 8/2011 | Mandhani |
| 8,023,508 B2 | 9/2011 | Horton |
| 8,069,286 B1 | 11/2011 | Orthner et al. |
| 8,199,157 B2 | 6/2012 | Park et al. |
| 8,225,019 B2 | 7/2012 | Asnaashari |
| 8,286,014 B2 | 10/2012 | Han et al. |
| 8,364,874 B1 | 1/2013 | Schlansker et al. |
| 8,437,369 B2 | 5/2013 | Shaikli |
| 8,443,422 B2 | 5/2013 | Weber et al. |
| 2001/0044881 A1* | 11/2001 | Fu et al. .................. 711/137 |
| 2002/0038401 A1 | 3/2002 | Zaidi |
| 2003/0088722 A1 | 5/2003 | Price |
| 2003/0227926 A1 | 12/2003 | Ramamurthy et al. |
| 2004/0088458 A1* | 5/2004 | Tomlinson et al. ........... 710/113 |
| 2004/0177176 A1 | 9/2004 | Li et al. |
| 2004/0218600 A1 | 11/2004 | Alasti et al. |
| 2005/0010687 A1 | 1/2005 | Dai |
| 2005/0091432 A1* | 4/2005 | Adams et al. ................. 710/100 |
| 2005/0120323 A1 | 6/2005 | Goodnow et al. |
| 2005/0137966 A1 | 6/2005 | Munguia et al. |
| 2005/0177664 A1 | 8/2005 | Cho et al. |
| 2005/0289369 A1 | 12/2005 | Chung et al. |
| 2005/0289374 A1 | 12/2005 | Kim et al. |
| 2006/0053111 A1* | 3/2006 | Bradley ........................... 707/8 |
| 2006/0101179 A1 | 5/2006 | Lee et al. |
| 2006/0218336 A1 | 9/2006 | Ishizawa et al. |
| 2007/0006108 A1 | 1/2007 | Bueti |
| 2007/0067549 A1 | 3/2007 | Gehman |
| 2008/0059441 A1 | 3/2008 | Gaug et al. |
| 2008/0082840 A1 | 4/2008 | Kendall et al. |
| 2008/0147858 A1 | 6/2008 | Prakash et al. |
| 2008/0163005 A1 | 7/2008 | Sonksen et al. |
| 2008/0235415 A1 | 9/2008 | Clark et al. |
| 2008/0288689 A1 | 11/2008 | Hoang et al. |
| 2008/0310458 A1 | 12/2008 | Rijpkema |
| 2009/0006165 A1 | 1/2009 | Teh et al. |
| 2009/0119432 A1 | 5/2009 | Lee et al. |
| 2009/0235099 A1 | 9/2009 | Branover et al. |
| 2009/0249098 A1 | 10/2009 | Han et al. |
| 2009/0296624 A1 | 12/2009 | Ryu et al. |
| 2009/0296740 A1 | 12/2009 | Wagh |
| 2009/0300245 A1 | 12/2009 | Shoemaker et al. |
| 2010/0199010 A1 | 8/2010 | Goren et al. |
| 2010/0220703 A1 | 9/2010 | Farrugia et al. |
| 2010/0235675 A1 | 9/2010 | Subramanian et al. |
| 2010/0262855 A1 | 10/2010 | Buch et al. |
| 2010/0293304 A1 | 11/2010 | Alexandron et al. |
| 2010/0312942 A1 | 12/2010 | Blinick et al. |
| 2011/0032947 A1 | 2/2011 | Brueggen |
| 2011/0078315 A1 | 3/2011 | Matsushita et al. |
| 2011/0078356 A1 | 3/2011 | Shoemaker |
| 2011/0093576 A1 | 4/2011 | Cherian et al. |
| 2011/0238728 A1 | 9/2011 | Nagarajao et al. |
| 2012/0051297 A1 | 3/2012 | Lee et al. |
| 2012/0066468 A1 | 3/2012 | Nakajima et al. |
| 2012/0079590 A1 | 3/2012 | Sastry et al. |
| 2012/0233514 A1 | 9/2012 | Patil et al. |
| 2012/0303842 A1 | 11/2012 | Cardinell et al. |
| 2012/0303899 A1 | 11/2012 | Ash et al. |
| 2012/0311213 A1 | 12/2012 | Bender et al. |
| 2013/0054845 A1 | 2/2013 | Nimmala et al. |
| 2013/0089095 A1 | 4/2013 | Chen et al. |

OTHER PUBLICATIONS

U.S. Patent and Trademark Office, Final Office Action mailed Jun. 13, 2014, with Reply to Final filed Aug. 7, 2014 in U.S. Appl. No. 13/248,234.

U.S. Patent and Trademark Office, Final Office Action mailed Apr. 8, 2014, with Reply filed Jun. 6, 2014, in U.S. Appl. No. 13/248,252.

U.S. Patent and Trademark Office, Office Action mailed Apr. 23, 2014, with Reply filed Jul. 22, 2014, in U.S. Appl. No. 13/222,362.

U.S. Patent and Trademark Office, Office Action mailed Mar. 31, 2014, with Reply filed Jun. 26, 2014, in U.S. Appl. No. 13/222,354.

U.S. Patent and Trademark Office, Final Office Action mailed Jul. 7, 2014, with Reply filed Aug. 22, 2014 in U.S. Appl. No. 13/222,354.

U.S. Patent and Trademark Office, Office Action mailed Oct. 23, 2013, with Reply filed Jan. 22, 2014, in U.S. Appl. No. 13/306,244.

U.S. Patent and Trademark Office, Final Office Action mailed Apr. 30, 2014, with PreAppeal Request and Notice of Appeal filed Jul. 23, 2014 in U.S. Appl. No. 13/306,244.

PCI-SIG, "PCI Local Bus Specification, Revision 3.0," Feb. 3, 2004, 3 pages.

U.S. Appl. No. 14/326,654, filed Jul. 9, 2014, entitled "Common Idle State, Active State and Credit Management for an Interface", by Sridhar Lakshmanamurthy, et al.

U.S. Appl. No. 14/209,207, filed Mar. 13, 2014, entitled "Aggregating Completion Messages in a Sideband Interface", by Sridhar Lakshmanamurthy, et al.

U.S. Appl. No. 14/209,184, filed Mar. 13, 2014, entitled "Providing Multiple Decode Options for a System-On-Chip (SoC) Fabric", by Sridhar Lakshmanamurthy, et al.

U.S. Appl. No. 14/209,146, filed Mar. 13, 2014, entitled "Supporting Multiple Channels of a Single Interface", by Sridhar Lakshmanamurthy, et al.

U.S. Appl. No. 14/295,810, filed Jun. 4, 2014, entitled "Issuing Requests to a Fabric", by Sridhar Lakshmanamurthy, et al.

U.S.Patent and Trademark Office, Office Action mailed Jul. 22, 2014, in U.S. Appl. No. 14/295,810.

U.S. Appl. No. 13/248,234, filed Sep. 29, 2011, entitled, "Sending Packets With Expanded Headers", by Sridhar Lakshmanamurthy, et al.

U.S. Appl. No. 13/248,232, filed Sep. 29, 2011, entitled, "Common Idle State, Active State and Credit Management for an Interface", by Sridhar Lakshmanamurthy, et al.

U.S. Appl. No. 13/248,243, filed Sep. 29, 2011, entitled, "Aggregating Completion Messages in a Sideband Interface", by Sridhar Lakshmanamurthy, et al.

U.S. Appl. No. 13/248,252, filed Sep. 29, 2011, entitled, "Providing Error Handling Support to Legacy Devices", by Sridhar Lakshmanamurthy, et al.

U.S. Appl. No. 13/248,263, filed Sep. 29, 2011, entitled, "Providing Multiple Decode Options for a System-On-Chip (SoC)", by Sridhar Lakshmanamurthy, et al.

U.S. Appl. No. 13/248,270, filed Sep. 29, 2011, entitled, "Supporting Multiple Channels of a Single Interface", by Sridhar Lakshmanamurthy, et al.

U.S. Appl. No. 13/222,362, filed Aug. 31, 2011, entitled, "Integrating Intellectual Property (IP) Blocks Into a Processor", by Prashanth Nimmala, et al.

U.S. Appl. No. 13/306,244, filed Nov. 29, 2011, entitled, "Providing a Sideband Message Interface for System on a Chip (SoC)", by Robert P. Adler, et al.

(56) References Cited

OTHER PUBLICATIONS

U.S. Appl. No. 13/222,354, filed Aug. 31, 2011, entitled, "Providing Adaptive Bandwidth Allocation for a Fixed Priority Arbiter", by Kie Woon Lim, et al.

Intel Corporation, "An Introduction to the Intel QuickPath Interconnect," Jan. 2009, pp. 1-22.

Sousek, et al., "PCI Express Core Integration with the OCP Bus," CAST, Inc., 2006, 15 pages.

Mentor Graphics, "PCI Express to AMBA 3 AXI Bridge IP," Mentor Graphics, Jun. 2007, 2 pages.

Everton Carara, et al., "Communication Models in Networks-on-Chip," 18th IEEE/IFIP International Workshop on Rapid System Prototyping (RSP '07), 2007, pp. 57-60.

* cited by examiner

ISSUING REQUESTS TO A FABRIC

This application is a continuation of U.S. patent application Ser. No. 14/295,810, filed Jun. 4, 2014, which is a divisional of U.S. patent application Ser. No. 13/248,276, filed Sep. 29, 2011, now U.S. Pat. No. 8,775,700, issued Jul. 8, 2014, the content of which is hereby incorporated by reference.

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (hereafter the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (hereafter the PCI specification).

Such designs are highly segmented due to varying requirements from the server, desktop, mobile, embedded, ultra-mobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device.

One reason for this complexity is arbitration among multiple requests, as typically an IP block issues a request to an arbiter by asserting a request signal and holding it asserted until granted. This method of arbitration cannot be easily applied to multiple IP blocks on a single semiconductor die, due to location variations of the agents, causing routing and bandwidth challenges. In addition, ordering rules of certain protocols can cause significant latency in issuance, and thus, granting of requests.

DETAILED DESCRIPTION

In various embodiments, a request protocol can be used in many different system designs. More specifically, embodiments may provide a request protocol for use in a semiconductor device such as a system-on-chip (SoC) or other processor-based semiconductor device. This protocol can be designed for use in connection with a common, converged intellectual property (IP) interface standard that allows a compliant IP block to be reused in any fabric topology of different semiconductor devices. To this end, the request protocol can be robust and flexible enough to work in any possible fabric at any possible performance level while still being PCI ordering rule compliant to maintain compatibility with existing x86 software.

The request protocol described herein may implement request queues in a fabric with corresponding request credits tracked in an agent coupled to the fabric, provide for request credit initialization and re-initialization, provide a single multiplexed request interface for all request types and channels, including handling of specification-defined and agent-specific request attributes, and extend transaction ordering to be a common responsibility of both agent and fabric.

Figure 1:
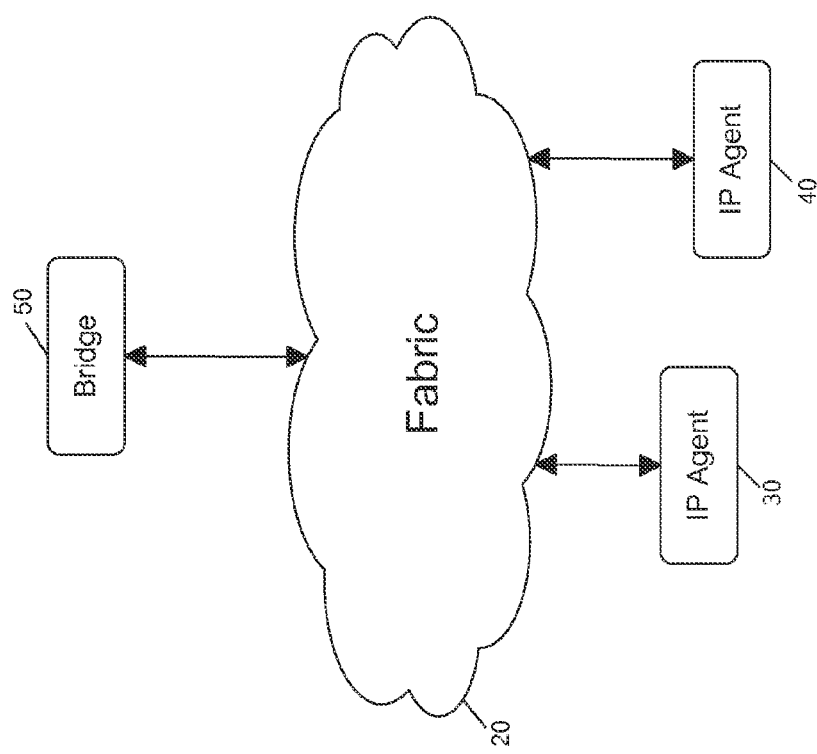
FIG. 1 is a block diagram of a basic interconnect architecture in accordance with an embodiment of the present invention.

Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD)

interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
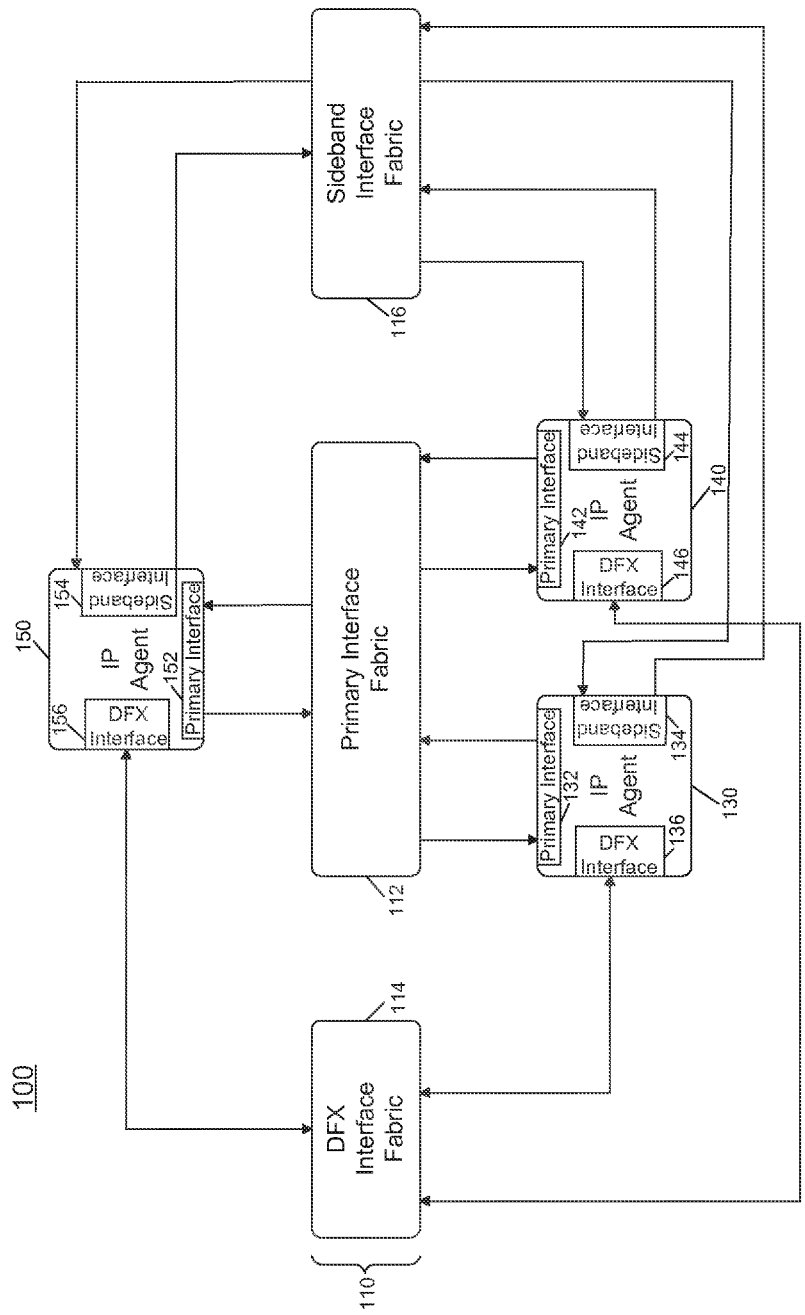
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
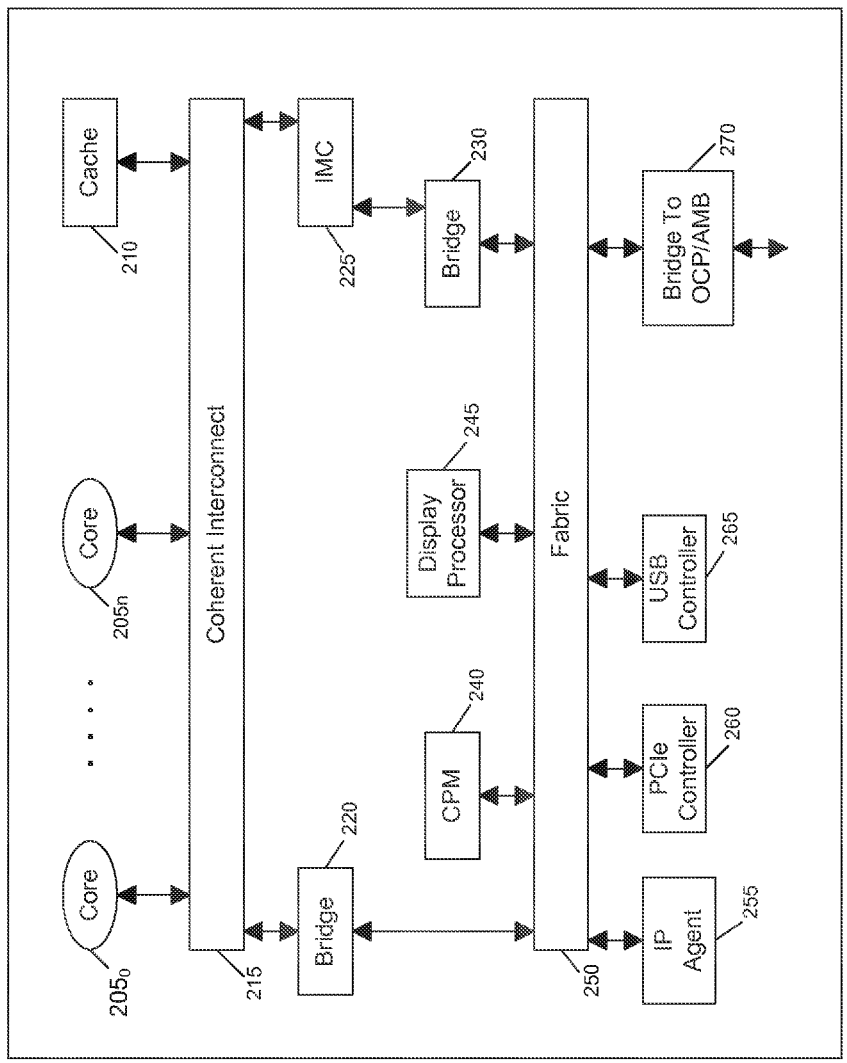
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
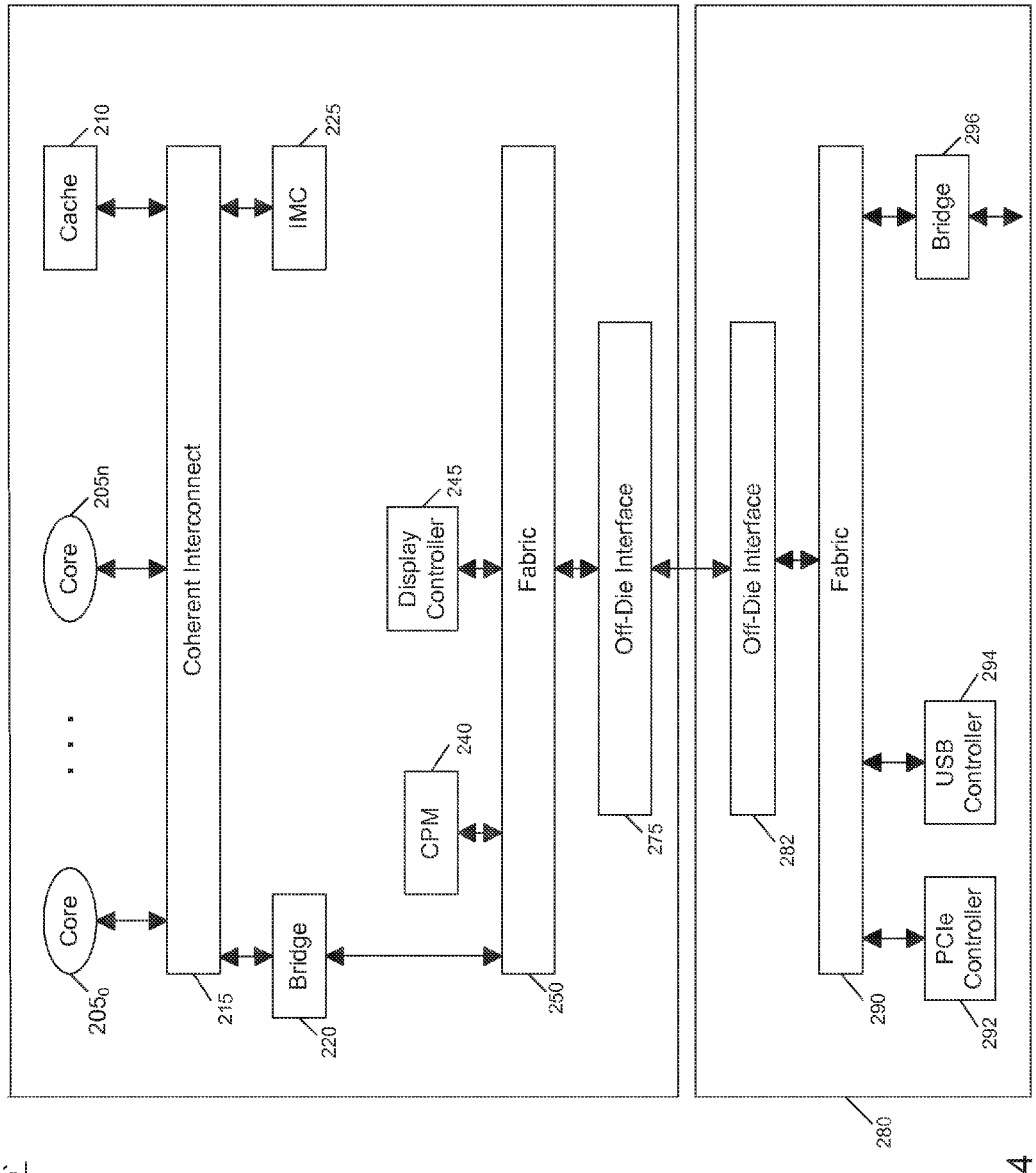
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296

The IOSF specification is a queue-based protocol. Each queue is identified by a channel ID for the channel it is associated with and the request type stored in the queue, e.g., posted (P), non-posted (NP), or completion (CP), in one embodiment. The channel ID together with the request type forms a unique queue ID (QID).

To track resources, embodiments may use credits to represent the amount of buffer space in a corresponding queue. For every queue, there is a corresponding credit tracker which in one embodiment can be implemented as a credit tracking register or counter. For requests to be issued by an agent, a request credit is tracked by the agent and represents the available space in the request queue in the fabric for the corresponding QID. Similarly for transactions to be sent to an agent from the fabric, a transaction credit is tracked by the fabric and represents the available space in the transaction queue in the agent for the corresponding QID.

In general, for a primary interface connection between agent and fabric, there are two types of credits, request credits and transaction credits. A request credit gives the master side of an agent the ability to issue a request to the fabric. A transaction credit includes both a command and data credit. Before a fabric puts a transaction to the target side of an agent, it ensures that the target side of the agent has given it the appropriate amount of transaction credits for the transaction in question (e.g., one command credit and as many data credits as needed to store the data associated with the transaction).

In general, for a sideband interface, there is just one type of credit, but both the router (e.g., fabric) and endpoint (e.g., agent) keep track of the credit advertised by the other side. A single credit on the sideband interface allows the sender (master side of router or agent) the ability to send a single flow control unit (flit). Accordingly, the master ensures that it has an available credit before it can put a flit to the other side.

Thus an agent master interface cannot put a request into the fabric arbiter unless there is a request credit available. When the agent issues a request put to the fabric arbiter, it updates a credit associated with the request. For example, the agent may decrement a request credit counter for the associated request type. When the fabric issues a transaction grant for that request, it removes the request from its fabric request queue and the corresponding request credit in the agent can be updated (e.g., incremented).

Figure 5:
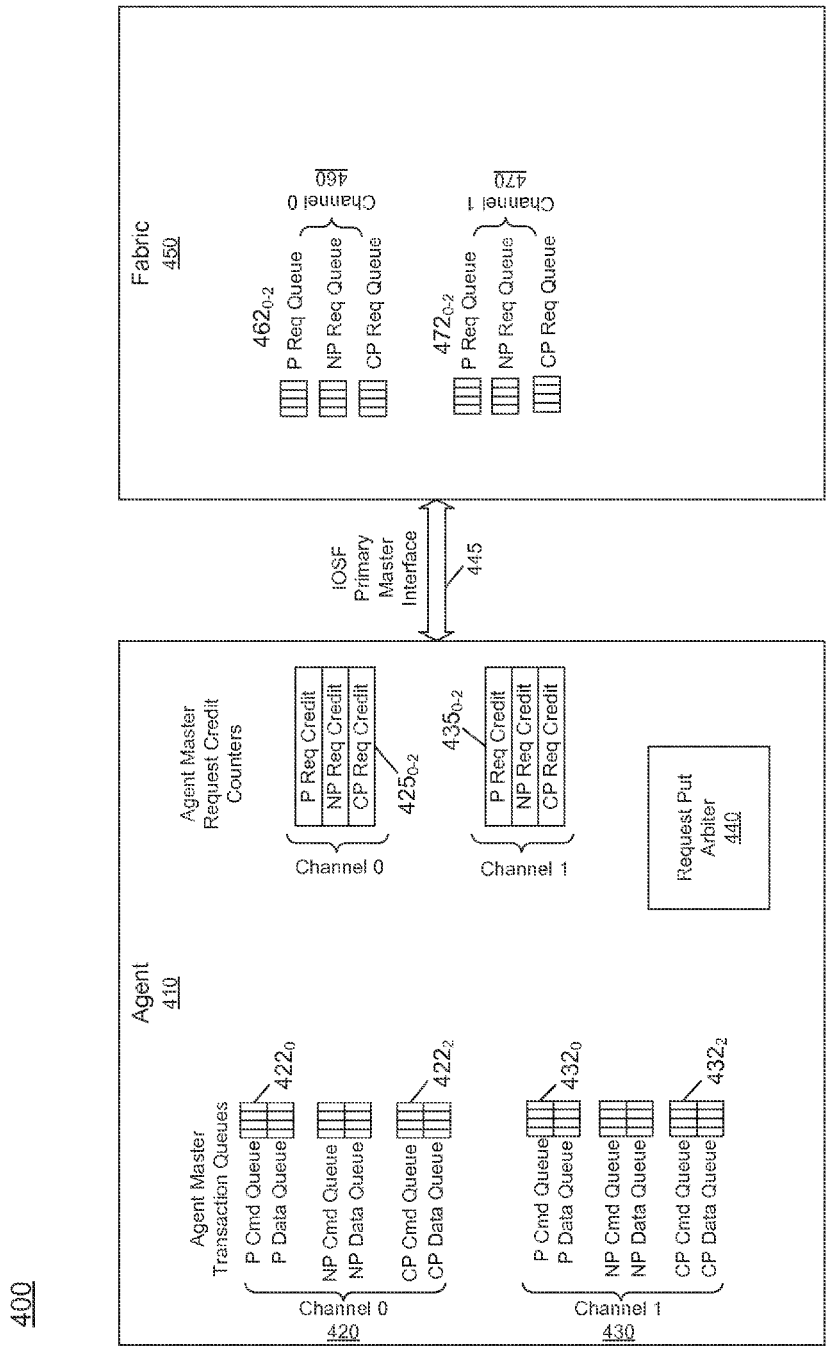
FIG. 5 is a block diagram of a portion of a SoC in accordance with an embodiment of the present invention.

Referring now to FIG. 5, shown is a block diagram of a portion of a SoC in accordance with an embodiment of the present invention. As shown in FIG. 5, the portion of SoC 400 shown includes an agent 410 and a fabric 450 coupled via primary master interface 445. Accordingly, the portion of the agent and fabric shown in FIG. 5 is with regard to a master interface of the agent in which the agent seeks to issue transactions to target agents (not shown for ease of illustration in FIG. 5) and the portion of the fabric shown in FIG. 5 is a portion of a target interface of the fabric that includes request queues to receive incoming requests from agent 410.

More specifically, agent 410 includes multiple channels. For ease of illustration, two such channels are shown, namely channel 420 (i.e., channel 0) and channel 430 (i.e., channel 1). Each channel includes corresponding transaction queues $422_0$-$422_2$ and $432_0$-$432_2$. In the embodiment shown, each transaction queue structure may include independent queues for a command portion of a transaction and a data portion of the transaction. And as seen, each channel may include multiple such transaction queues for different request types, namely a posted queue, non-posted, and completion. To determine whether the agent can put a request to fabric 450, each channel may include credit trackers, namely request credit counters $425_0$-$425_2$ and $435_0$-$435_2$. Thus each request type includes its own credit counter to maintain a count of credits available, e.g., corresponding to request queues available in the fabric for the type of request. As further seen in FIG. 5, agent 410 can also include a request put arbiter 440, operation of which will be discussed further below.

In turn, fabric 450 includes multiple channels, namely a first channel 460 (i.e., channel 0) and a second channel 470 (i.e., channel 1). Note that although shown with the matching number of channels, the scope of the present invention is not limited in this regard, and in some embodiments the fabric can be configured with a different number of channels than the corresponding master interface of the agent. As seen, each channel may include corresponding request queues for each of the request types, namely queues $462_0$-$462_2$ and $472_0$-$472_2$. Note that as configured, a SoC may have a 1:1 relationship between request queues in the fabric and the request credit counters in the agent. That is, a maximum number of credits available in the agent's request credit counters may correspond to the size of the corresponding request queues in the fabric. Although shown with this particular implementation in the embodiment of FIG. 5, understand the scope of the present invention is not limited in this regard.

A primary interface credit initialization phase occurs shortly after the primary interface reset has de-asserted. In one embodiment, an interface state machine may determine when to begin credit initialization. During request credit initialization, the fabric asserts a grant to the agent with the grant type field set to credit initialization. The other grant attributes of request type and channel ID identify the QID of the credit being initialized. For each clock that the grant signal is asserted with the grant type field set to credit initialization, the request credit counter for the corresponding QID is incremented. In various embodiments, agents may size their request credit counters based on their own requirements. Any increment value that would result in the agent's credit counter exceeding its maximum value is discarded and the credit counter is left at the maximum value supported by the agent.

In various embodiments, a single multiplexed request interface (e.g., interface 445) coupled between agent and fabric may be provided for all request types and channels. To this end, each agent master interface may include a request put arbiter. When the agent has a transaction to send, it issues a request to the request put arbiter. There is an input to the request put arbiter for each channel and request type supported by the agent master. If there is a request credit available for the corresponding request type, the request put arbiter issues a put signal, e.g., a one clock request put pulse on the master request interface, and sends the channel ID and request type along with additional request attributes to the fabric, after making an arbitration decision.

Figure 6:
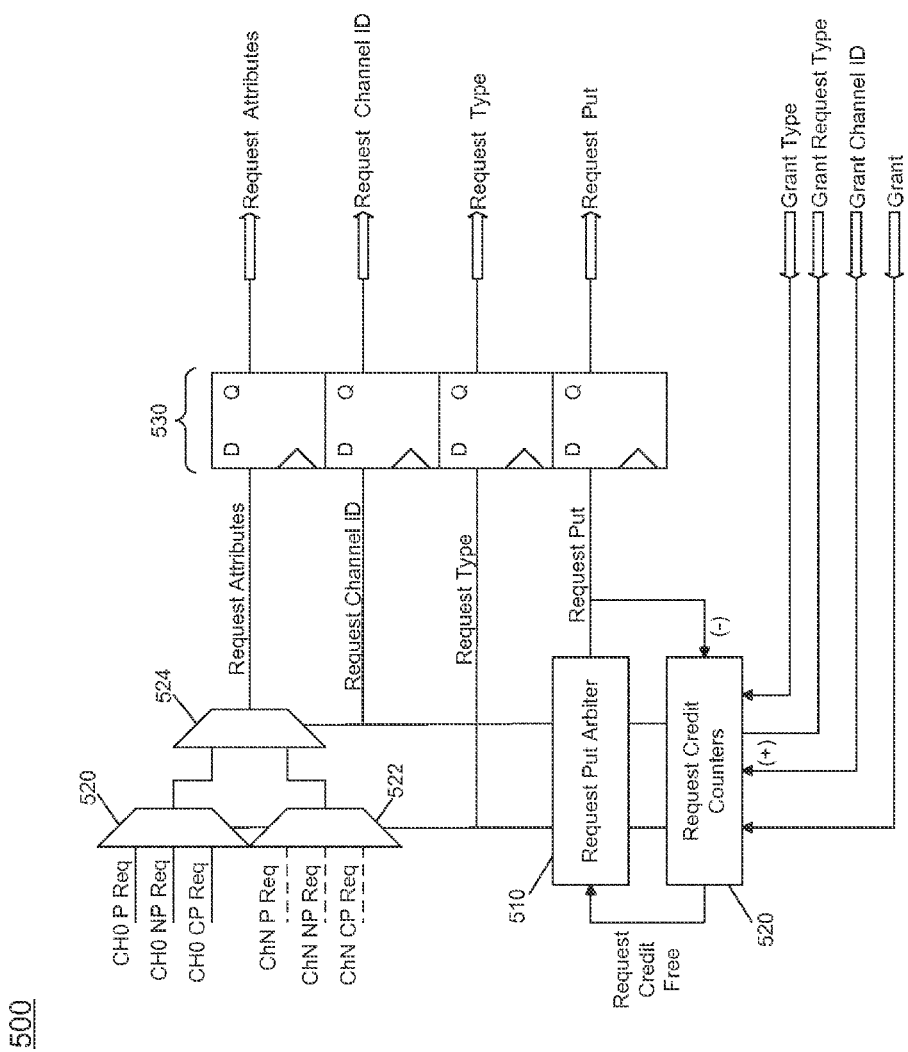
FIG. 6 is a block diagram of an agent master request put interface in accordance with an embodiment of the present invention.

Referring now to FIG. 6, shown is a block diagram of an agent master request put interface in accordance with an embodiment of the present invention. As seen in FIG. 6, interface 500 may include a request put arbiter 510 and request credit counters 520, e.g., as discussed above with regard to FIG. 5. Based on control of arbiter 510, a selected one of multiple requests from the channels (and request types) received in a pair of multiplexers 520 and 522 can be selected. And further based on control of request put arbiter 510, a selected one of the requests selected from each channel can be output from an output multiplexer 524. In turn, a buffer structure 530, which can be configured using D-type flip-flops, registers or another temporary storage, can provide various information to be multiplexed out with a request put pulse to the fabric. Specifically as seen in the embodiment of FIG. 6, such information may include request attributes, present in a command portion of the transaction, a request channel identifier, also present in the command portion, along with a request type and an active request put signal generated from request put arbiter 510. As further seen in FIG. 6, a request can be input from each of the request type queues for each channel into multiplexers 520 and 530.

In various embodiments, request credit counters 520 may receive as inputs various signals from the fabric, e.g., from a fabric arbiter. In the embodiment shown in FIG. 6, the counters may receive an indication of the grant type (e.g., a show command grant, transaction grant, credit initialization grant, or other such grant). In addition, a grant request type (e.g., posted, non-posted, or completion) and channel ID can be received to thus indicate the corresponding queue for which a request was granted, and thus the corresponding request credit counter can be incremented when a transaction of a given type is granted. As further seen, a counter can similarly be decremented when request put arbiter 510 issues a request put.

When the fabric arbiter receives the request put, it uses the channel ID and request type to de-multiplex the request put, and load the request attributes into the appropriate fabric request queue. The output of the fabric request queue feeds into a fabric arbiter. After completing arbitration, the fabric provides a transaction grant back to the agent. With the grant, the fabric arbiter provides the channel ID and request type to identify which request is being granted.

Figure 7:
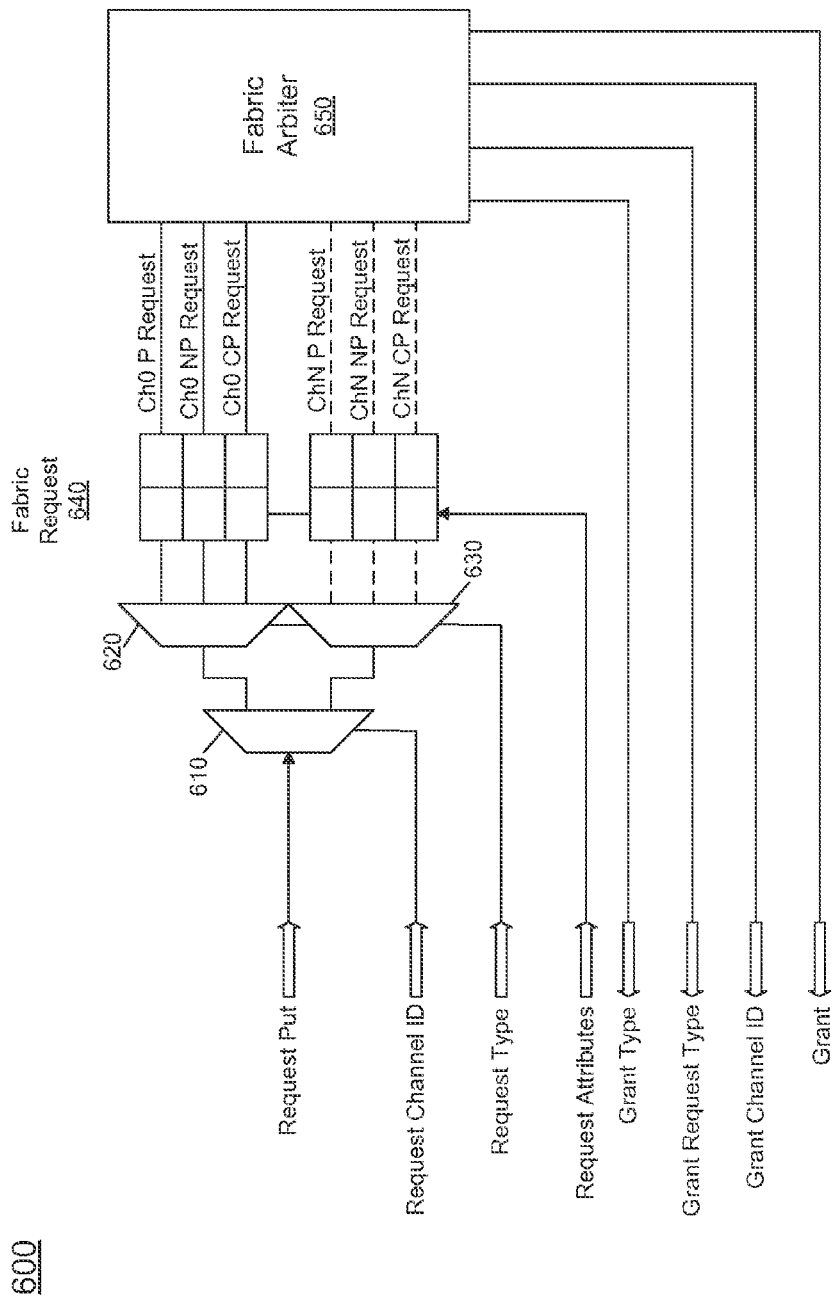
FIG. 7 is a block diagram of a fabric request queue and arbiter structure in accordance with an embodiment of the present invention.

Referring now to FIG. 7, shown is a block diagram of a fabric request queue and arbiter structure 600 in accordance with an embodiment of the present invention. As shown in FIG. 7, a request put is received at an input multiplexer 610, which is controlled by a channel identifier provided with the request to indicate the given channel for which the request is received. Accordingly, based on that control, input multiplexer 610 may provide the request put to the corresponding multiplexer 620 or 630. In turn, based on the request type (e.g., posted, non-posted or completion) the request input can be used to control input of the corresponding received request attributes into the appropriate one of the fabric request queues 640. As seen, each such queue may provide a request (e.g., in first-in-first-out order) to a fabric arbiter 650, which may perform an arbitration between these various requests. Based on the arbitration performed, a grant can be sent to the master interface of the agent. More specifically, in addition to the grant signal, a grant type, a grant request type and a grant channel ID may be provided. Although shown with this particular implementation in the embodiment of FIG. 7, understand the scope of the present invention is not limited in this regard.

Thus in various embodiments, along with the request channel ID and request type, a plurality of attributes can be provided with the request. These attributes include those that are pre-defined by the IOSF specification and agent-specific attributes, which may be optional. Referring now to Table 1, shown is a list of request attributes that may be present/required in accordance with an embodiment of the present invention.

TABLE 1

| Request Attribute Field | Optional/ Required | Description |
|---|---|---|
| Channel ID | Required if the agent supports more than one channel | An independent channel identifier. Used along with the Request Type to identify to the fabric arbiter which request queue to put the request. Returned to the agent during a grant along with the Request Type to identify the master agent's queue (QID) associated with the grant. |
| Request Type | Required | The transaction classification of posted, non-posted, or completion. Returned to the agent during a grant. |
| Contains Data | Required | If asserted '1', indicates that the transaction contains one or more DW of data. The signal sent as the request attribute is the same as the fmt[1] field sent during the command phase. |
| Data Length | Required | Indicates the number of DW of data for the transaction. This field is only meaningful if the Contains Data field is set. |
| Traffic Class | Required | Identifies the Traffic Class of the transaction. |
| Non-Snoop | Required | If '1', indicates the transaction is not required to be snooped. |
| Relaxed Order | Required | If '1', indicates the transaction follows the PCI express relaxed ordering rules. |
| ID Based Ordering (IDO) | Optional | If '1', indicates the transactions follows the PCI Express ID based ordering rules. |
| Locked | Required | Asserted if the transaction is for a locked memory read request or a locked read completion. |
| Chain | Optional | The chain request attribute is provided as a hint to the fabric arbiter that the agent has a sequence of transactions that can be granted back-to-back to improve accesses to system memory. |
| Opportunistic | Optional | If "1", indicates that the request is opportunistic. Fabric can choose to service the request at a lower priority. |
| Agent Specific | Optional | Agent specific request attributes. |
| Destination ID | Optional | Source decoded destination information conveyed to the fabric. |
| Request ID | Optional | For posted and non-posted transaction, the transaction's Requester ID. For completion transactions, the transaction's Completer ID. |

As discussed above, many different protocols have certain ordering requirements. For example, PCIe™ has certain requirements with regard to ordering between reads and writes (e.g., non-posted and posted transactions). According to the IOSF specification, meeting transaction ordering rules is a shared responsibility between an agent and fabric arbiter. Embodiments thus extend the transaction ordering rules into the fabric arbiter and define the request put as the ordering point. Thus this ordering point is the point in time at which the order of a set of transactions is captured. And, by extending the transaction ordering rules into the fabric, the arbiter can pipeline decode and improve performance. In one embodiment, the transaction ordering rules at an agent's primary interface are a simpler form of the PCIe™ system level transaction ordering rules, such that producer-consumer requirements and deadlock avoidance provide the basis for the transaction ordering rules. These transaction ordering rules of an agent can be extended into the fabric arbiter such that a request put to the fabric arbiter defines the transaction ordering point.

It is the agent's responsibility to ensure that all producer-consumer requirements have been met for a given transaction prior to issuing a request put. For example, a bridge cannot issue a request put to the fabric arbiter for a non-posted read request or a strongly ordered completion until any posted transactions that were received prior to the read or strongly ordered completion of the same channel have issued their request puts. The fabric arbiter continues to enforce producer-consumer requirements, ensuring that a non-posted request or a strongly ordered completion does not pass any previously requested posted transactions by being granted ahead of them.

Deadlock avoidance dictates that posted writes and completions be allowed to pass blocked non-posted transactions and posted transactions be allowed to pass blocked completions. From the agent perspective, a request is blocked if there are no request credits available for that QID. For example, if the agent has a non-posted request that has met producer-consumer requirements such that it could be put to the fabric arbiter, but it does not have any non-posted request credits, the agent instead issues a request put for a posted or completion transaction if it has posted or completion transactions to send that have available request credits, thus allowing them to pass the blocked non-posted request. The fabric arbiter also avoids deadlock by allowing posted writes and completions to pass blocked non-posted transactions and posted transactions to pass blocked completions. For the fabric arbiter, a request is blocked if there are insufficient transaction credits to grant the request.

Within each channel, the fabric arbiter processes the different requests in a manner to obey ordering rules, namely following the primary interface transaction ordering rules. That is, the fabric arbiter issues resulting transaction grants to a master agent according to ordering rules; however, it need not apply any transaction ordering rules between channels.

If asserted with a request, a relaxed order attribute indicates that the transaction follows PCIe™ relaxed ordering rules. With this attribute set, a fabric arbiter may allow a relaxed order completion to pass a write request.

If asserted with a request, an ID-based ordering (IDO) attribute indicates that the transaction follows PCIe™ ID-based ordering rules. With this attribute set, a fabric arbiter may allow an IDO read or completion to pass a posted write if the bus/device/function (ID) of the transaction is different from the posted write. Note that the IDO request attribute by itself does not provide the fabric arbiter enough information to change arbitration based on ID. Accordingly, the fabric arbiter may obtain the requester ID and completer ID through a command interface (and/or) through the request ID request attribute to fully support IDO.

In one embodiment, all agents and fabric may be configured to follow the ordering rules defined in Table 2 below. The rules defined in this Table apply uniformly to all types of transactions including memory, IO, configuration, and messages. Note that the ordering rules defined in Table 2 apply within a single channel, as there is no ordering requirement among transactions between different channels.

TABLE 2

| Row Pass Column? | Posted Transaction (col 2) | Non-Posted Transaction (col 3) | Completion Transaction (col 4) |
| --- | --- | --- | --- |
| Posted Transaction (row A) | No | Yes | Yes |
| Non-Posted Transaction (row B) | a) No<br>b) Yes/No | No | Yes/No |
| Completion Transaction (row C) | a) No<br>b) Yes/No | Yes | No |

For Table 2, the columns represent a first issued request put and the rows represent a subsequently issued request put. The table entry indicates the ordering relationship between the two requests. The table entries are defined as follows:

Yes—the second transaction (row) is allowed to pass the first (column) to avoid deadlock, such that when blocking occurs, the second transaction passes the first transaction. Fairness is comprehended to prevent starvation. For an agent, a transaction is blocked if there are no request credits in the fabric arbiter. For the fabric arbiter, a transaction is blocked if there are insufficient transaction credits available at the target. The target of a transaction can be an agent or buffers within the fabric.

Yes/No—there are no requirements. The second transaction may optionally pass the first transaction or be blocked by it.

No—the second transaction is not allowed to pass the first transaction, thus supporting producer-consumer strong ordering model.

The following list refers to the specific entries in Table 2 and provides an explanation of the rules applied in Table 2.

A2: Transactions with the same QID cannot pass each other.
A3: A posted transaction is allowed to pass non-posted transactions to avoid deadlocks.
A4: A posted transaction is allowed to pass completion transactions to avoid deadlocks. While it is true that a posted transaction is allowed to be blocked by a completion transaction that is pre-allocated, to ensure interoperability among agents where some may not pre-allocate, writes can be configured to pass completions.
B2a: Non-posted transactions are not allowed to pass posted transactions to meet producer-consumer use model requirements unless B2b applies.
B2b: A non-posted request with an IDO attribute set is permitted to pass a posted request if the two requester ID's are different.
B3: Transactions with the same QID cannot pass each other.
B4: Non-posted transactions are allowed to be blocked by or to pass completion transactions.
C2a: A completion transaction cannot pass a posted transaction unless C2b applies.
C2b: A completion transaction with the relaxed ordering attribute bit set is permitted to pass a posted transaction. A completion with IDO set is permitted to pass a posted request if the completer ID of the completion is different from the requester ID of the posted request.
C3: A completion transaction is allowed to pass non-posted transactions to avoid deadlocks.
C4: Transactions with the same QID cannot pass each other.

Consider now a simplified arbitration pipeline having a clock cycle for each pipeline stage of: request put; decode; arbitrate; and grant. In the example below, assume an agent is to issue a posted request followed by a non-posted request. Table 3 below shows a conventional ordering model where the agent could not issue the non-posted request NP1 until it received the grant for the previous posted transaction, P1.

Accordingly, in this example, the non-posted request NP1 is not granted until clock 8.

TABLE 3

| Clock | Request Put | Decode | Arbitrate | Grant |
|-------|-------------|--------|-----------|-------|
| 1     | P1          |        |           |       |
| 2     |             | P1     |           |       |
| 3     |             |        | P1        |       |
| 4     |             |        |           | P1    |
| 5     | NP 1        |        |           |       |
| 6     |             | NP 1   |           |       |
| 7     |             |        | NP 1      |       |
| 8     |             |        |           | NP 1  |

In Table 4, where transaction ordering is extended into the fabric and the transaction ordering point is the request put in accordance with an embodiment of the present invention, the agent can issue the non-posted request NP1 in the clock cycle immediately following issuance of the posted request P1 to perform a pipelined arbitration. This allows the fabric arbiter to grant the non-posted transaction at clock 5.

TABLE 4

| Clock | Request Put | Decode | Arbitrate | Grant |
|-------|-------------|--------|-----------|-------|
| 1     | P1          |        |           |       |
| 2     | NP1         | P1     |           |       |
| 3     |             | NP1    | P1        |       |
| 4     |             |        | NP1       | P1    |
| 5     |             |        |           | NP 1  |

Figure 8:
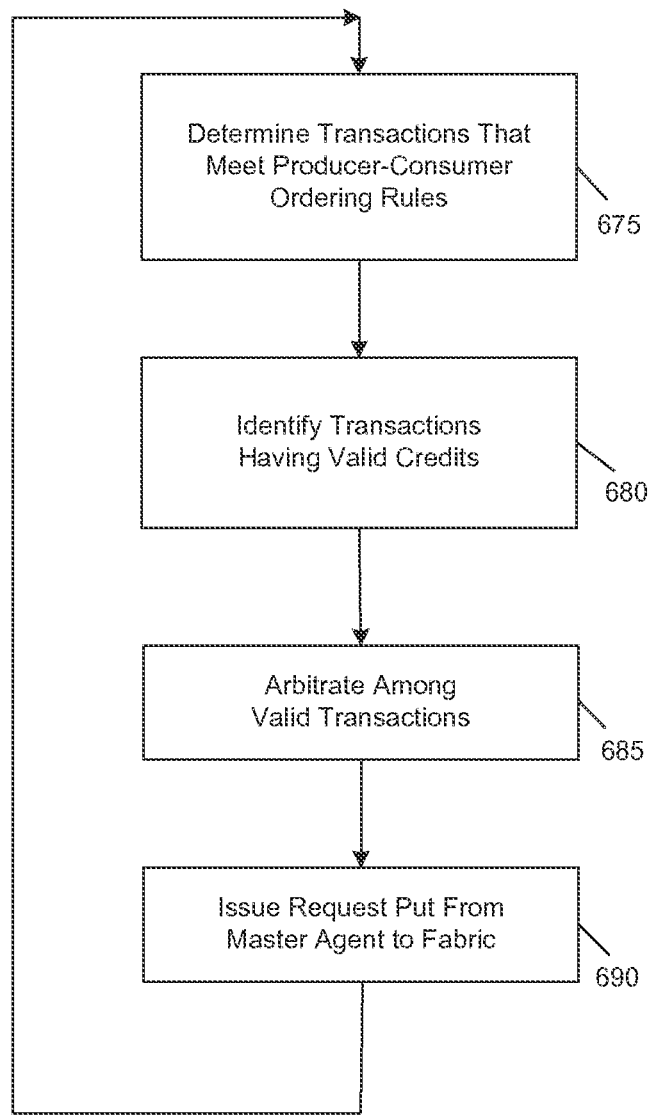
FIG. 8 is a flow diagram of arbitrating between requests in accordance with an embodiment of the present invention.

Referring now to FIG. 8, shown is a flow diagram of arbitrating between requests in accordance with an embodiment of the present invention. As shown in FIG. 8, method 670 may be implemented via a request put arbiter of a master agent coupled to a fabric. As seen, method 670 may begin by determining whether producer-consumer ordering rules have been met for various transactions (block 675). These transactions may be in multiple transaction queues of the agent. For example, a top entry of each queue of multiple channels of the agent can be analyzed to determine whether the corresponding transaction has met producer-consumer ordering rules. Although the scope of the present invention is not limited in this regard, in one embodiment this determination can be based upon a status indicator such as a ready bit or other means for identifying a transaction that has met ordering rules (such as a counter-based mechanism).

Next, at block 680 of these transactions that have met the ordering rules, transactions having valid credits can be identified. More specifically, for each of the transactions, a corresponding request credit counter of the master agent can be checked to determine whether a valid credit is available for the given type of transaction. Accordingly at block 680 a set of transactions having valid credits can be identified. Then at block 685, an arbitration can be performed from among these valid transactions. The arbitration can be performed in various manners. For example, in some implementations a round robin-based arbitration protocol can be performed. In other implementations a priority-based fixed priority arbitration can be used. Thus at block 685, the request put arbiter of the master agent can thus select one transaction to send in a given clock cycle. Thus at block 690 a request put corresponding to this arbitrated transaction can be issued from the master agent to the fabric.

As seen in FIG. 8, method 670 may thus iterate each clock cycle such that in every clock cycle it is possible to issue a request put to the fabric from the master agent. As such, more efficient processing can occur, as the master agent need not wait for a grant of a transaction before issuing a next transaction, even for the same channel and request type.

Note that the request put issued in a first iteration of block 690 may be for a first transaction that is issued from a transaction queue of a first channel, and may occur during a first clock cycle. Accordingly, a credit tracker associated with this request type for the channel can be updated, e.g., decremented.

As embodiments provide a transaction ordering model that is shared between the agent and the fabric, rather than waiting for a grant of this first transaction which, in one embodiment can be a posted transaction, a next transaction, e.g., a non-posted (second) transaction can be issued directly following this first transaction, e.g., in a next iteration of the flow of method 670, e.g., in a next cock cycle. Thus a second request put can be issued from the agent to the fabric for this second transaction in a second clock cycle (and a corresponding credit tracker associated with this request type for the channel can be updated) such that multiple requests can be pipelined from the agent without waiting for corresponding transaction grants. Note that when transaction grants are received in the master agent for these transactions, their credit trackers can be updated, e.g., incremented. Although shown with this particular implementation in the embodiment of FIG. 8, understand the scope of the present invention is not limited in this regard.

Figure 9:
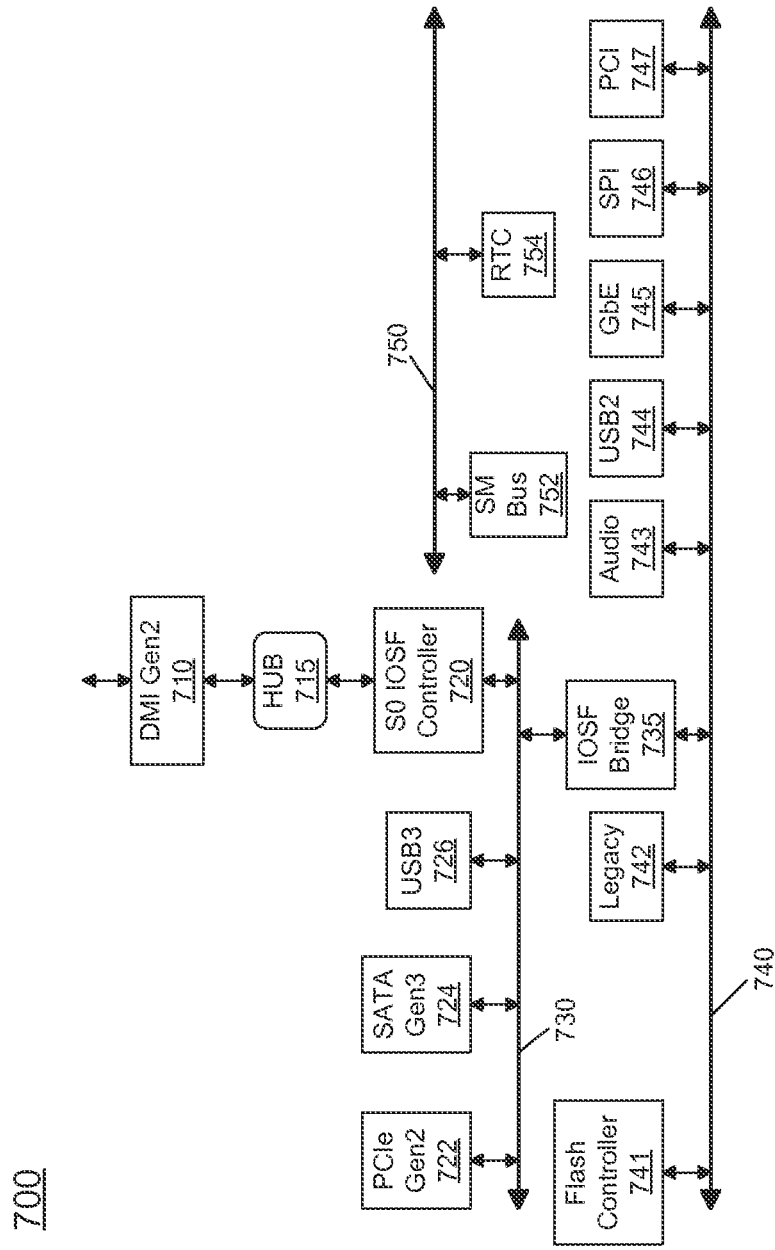
FIG. 9 is a more detailed block diagram of a portion of a SoC in accordance with an embodiment of the present invention.

Although the SoCs of FIGS. 3 and 4 are at a high level, understand that additional functionality may be present. Referring now to FIG. 9, shown is a more detailed block diagram of a portion of a SoC in accordance with an embodiment of the present invention. As shown in FIG. 9, the portion of SoC 700 shown may correspond to non-core portions coupled below a memory controller hub or other interface logic that can in turn interface to multiple processor cores, as well as to system memory.

Thus as seen, an off-die interface 710 (which in one embodiment can be a direct media interface (DMI)) may couple to a hub 715, e.g., an input/output hub that in turn provides communication between various peripheral devices. Although not shown for ease of illustration in FIG. 9, understand that various engines such as a manageability engine and a virtualization engine can also be directly coupled to hub 715.

To provide connection to multiple buses, which may be multi-point or shared buses in accordance with the IOSF specification, an IOSF controller 720 may couple between hub 715 and bus 730, which may be an IOSF bus that thus incorporates elements of the fabric as well as routers. In the embodiment shown in FIG. 9, first IOSF bus 730 may have coupled to it various controllers to provide for control of off-chip devices. Specifically, seen is a PCI controller 722, a SATA controller 724, and a USB controller 726. In turn, a second IOSF bus 750 may couple to a system management bus 752 and to a real time clock 754.

As further seen in FIG. 9, first IOSF bus 730 may couple to an IOSF bridge 735 for both primary and sideband information that in turn provides interconnection to a third bus 740, e.g., of a different protocol, to which various controllers and components may be attached. In the embodiment shown in FIG. 9, such components include a flash controller 741 to provide an interface to a non-volatile memory, a legacy device 742, which may implement various legacy functions, e.g., of a PCI specification and further may include an interrupt controller and timer. In addition, interfaces for audio 743, USB 744, gigabyte Ethernet (GbE) 745, serial peripheral interface (SPI) 746 and PCI 747 may all be provided. Although shown with this particular implementation in the embodiment of FIG. 9, understand the scope of the present invention is not limited in this regard.

Figure 10:
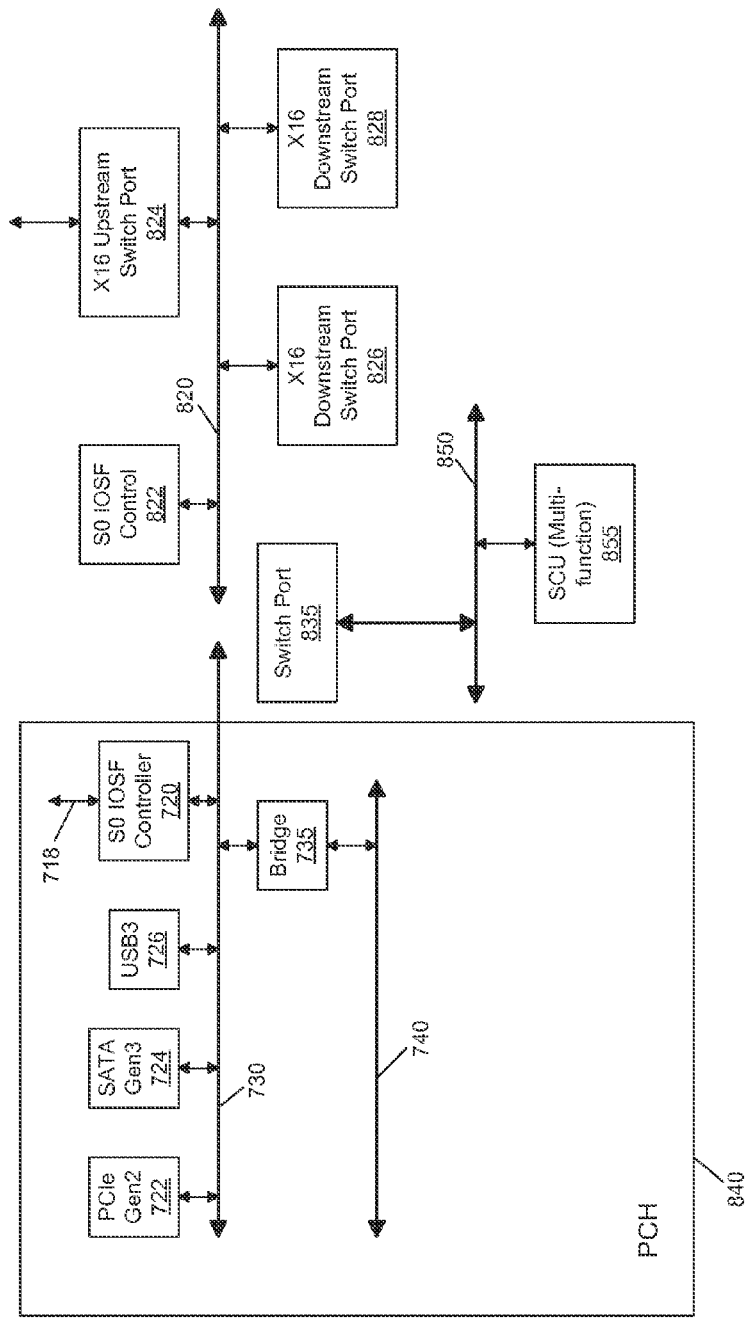
FIG. 10 is a block diagram of another SoC in accordance with an embodiment the present invention.

Still other implementations are possible. Referring now to FIG. 10, shown is a block diagram of another SoC in accordance with an embodiment the present invention. As shown in FIG. 10, SoC 800 may be configured for use, e.g., in server systems. As seen in FIG. 10, SoC may include a platform controller hub (PCH) 840, which may generally include components such as seen in the embodiment of FIG. 9. Namely, multiple IOSF buses 730 and 740 may be present, along with a bridge 735 to couple the buses. Bus 730 may include various agents coupled to it, including a PCIe controller 722, SATA controller 724, and a USB controller 726. In turn, via an IOSF controller 720, communication may occur via an additional bus 718, which may communicate with upstream devices, such as cores or other processing units (not shown for ease of illustration in the embodiment of FIG. 10).

As further seen in FIG. 10, for providing communications with other server-based components, an additional IOSF bus 820 may be provided, which in turn can communicate with an IOSF controller 822 and an upstream switch port 824 (e.g., an X16 port) that may be coupled to an upstream bus 825. Also coupled to bus 820 may be multiple downstream switch ports 826 and 828.

Furthermore, to enable communications, e.g., with storage units of a server-based system, a switch port 830 may couple between bus 820 and another IOSF bus 850, which in turn may be coupled to a storage controller unit (SCU) 855, which may be a multi-function device for coupling with various storage devices.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments thus enable agents and fabrics to be provisioned on differing locations of a die (e.g., some agents at much greater distances to the fabric than others), in part by enabling agents to issue a request put pulse, instead of holding a level request signal for a request protocol, such that any number of pipeline stages can be put between the agent and the fabric, and the arbiter frequency is not limited due to distance to the agent.

In addition, embodiments provide for ease of reuse of both fabric and agents, via the credit protocol used. That is, the time it takes from when a fabric arbiter receives a request put until it can issue a transaction grant is fabric specific. A fabric with a higher request-to-grant latency can simply have a deeper request queue in order to achieve the same performance (bandwidth) in a pipelined manner. And corresponding agents can be flexible as to this queue depth by maintaining a request credit counter that is initialized to the depth of the corresponding fabric, regardless of fabric instantiation with no changes required in the agent. In addition, by multiplexing request attributes for a request onto a single interface, the number of signals to be routed between agent and fabric can be reduced. Also, by extending transaction ordering rules into a fabric arbiter and defining a request put as the ordering point, decoding can be pipelined, reducing latency.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a semiconductor die including but not limited to:
an agent having a first plurality of request credit counters corresponding to a first channel and a second plurality of request credit counters corresponding to a second channel; and
a fabric coupled to the agent via a first interface, the fabric having a first plurality of request queues for the first channel and a second plurality of request queues for the second channel and a fabric arbiter to arbitrate between a plurality of requests from the agent and grant at least one of the plurality of requests;
wherein the agent is to issue a first request of the first channel including first attribute information to be put to the fabric in a first clock cycle and pipeline issue a second request of the first channel including second attribute information to be put to the fabric in a next clock cycle.

2. The apparatus of claim 1, wherein the first plurality of request queues for the first channel are to store incoming request attribute information from the agent for one or more request types.

3. The apparatus of claim 1, wherein the agent includes a first plurality of transaction queues for the first channel.

4. The apparatus of claim 1, wherein the agent is to issue the first request for a first transaction having a relaxed order attribute associated therewith.

5. The apparatus of claim 4, wherein the fabric arbiter is to allow the first transaction to pass a write transaction stored in a transaction queue of the fabric, based at least in part on the relaxed order attribute.

6. The apparatus of claim 1, wherein the first interface includes a multiplexed request interface to issue request puts including a channel identifier, a request type, and a plurality of request attributes.

7. The apparatus of claim 1, wherein the agent is to select the second request to issue, prior to receipt of a transaction grant for the first request.

8. The apparatus of claim 7, wherein the agent is to receive a transaction grant for the second request in a next clock cycle following receipt of the transaction grant for the first request.

9. A computer readable storage medium including information that, when manufactured into a system on a chip (SoC), is to configure the SoC to:
issue a first request put for a first transaction to be sent from an agent of the SoC to a fabric of the SoC to couple to the agent, in a first clock cycle, the first transaction of a first channel of the agent;
issue a second request put for a second transaction to be sent from the agent to the fabric, in a second clock cycle following the first clock cycle, the second transaction of the first channel, prior to receipt in the agent of a transaction grant for the first transaction from a fabric arbiter of the fabric; and send the first transaction from the agent to the fabric responsive to receipt of the transaction grant for the first transaction.

10. The computer readable medium of claim 9, wherein the information, when manufactured into the SoC, is to configure the SoC to determine, in the agent, whether producer-consumer ordering rules have been met for the first transaction, and if so, to issue the first request put.

11. The computer readable medium of claim 9, wherein the information, when manufactured into the SoC, is to configure the SoC to allow the first transaction to pass a write transaction stored in a transaction queue of the fabric, the first request put having a relaxed order attribute associated therewith.

12. The computer readable medium of claim 9, wherein the information, when manufactured into the SoC, is to configure the SoC to receive the transaction grant for the first transaction after issuance of the second request put.

13. The computer readable medium of claim 9, wherein the information, when manufactured into the SoC, is to configure the SoC to issue the first request put with a channel identifier, a request type, and a plurality of attributes.

14. The computer readable medium of claim 9, wherein the information, when manufactured into the SoC, is to configure the SoC to prevent the first request put from being issued until a request put for a posted transaction of the first channel has been issued, the posted transaction received prior to the first transaction, the first transaction comprising a non-posted transaction.

15. The computer readable medium of claim 14, wherein the information, when manufactured into the SoC, is to configure the SoC to issue the first request put before the request put for the non-posted transaction, wherein a credit counter associated with the non-posted transaction does not have an available credit.

16. A system-on-chip (SoC) comprising:
   at least one core to execute instructions;
   a coherent interconnect coupled to the at least one core;
   a memory controller coupled to the coherent interconnect;
   at least one agent; and
   a fabric coupled to the coherent interconnect and to the at least one agent;
   wherein the at least one agent is to issue a first request put for a first transaction to the fabric in a first clock cycle, the first transaction of a first channel of the at least one agent, issue a second request put for a second transaction to the fabric in a second clock cycle following the first clock cycle, the second transaction of the first channel, prior to receipt in the at least one agent of a transaction grant for the first transaction from a fabric arbiter of the fabric.

17. The SoC of claim 16, further comprising a bridge coupled to the fabric to communicate with at least one component.

18. The SoC of claim 17, wherein the at least one component is of an open core protocol (OCP) or an ARM advanced microcontroller bus architecture (AMBA) protocol.

19. The SoC of claim 16, wherein the at least one core comprises a first in-order core and a first out-of-order core.

20. The SoC of claim 16, wherein the SoC is to be incorporated in a server computer, the SoC including a storage controller to couple with at least one storage device and at least one bus to couple to at least one of a serial ATA (SATA) controller or a Peripheral Component Interconnect Express (PCIe) controller.

21. The SoC of claim 16, wherein the SoC is to be incorporated in a mobile device having Internet capability, wherein the SoC further includes a first interface to interface with an audio device and a second interface to interface with a universal serial bus (USB) device.

22. The SoC of claim 16, wherein the SoC is to be incorporated in a server computer.

23. The SoC of claim 16, wherein the SoC is to be incorporated in a mobile device having Internet capability.

* * * * *